US010571036B2

(12) United States Patent
Kobori et al.

(10) Patent No.: US 10,571,036 B2
(45) Date of Patent: Feb. 25, 2020

(54) VALVE DEVICE FOR EXHAUST FLOW PASSAGE

(71) Applicant: FUTABA INDUSTRIAL CO., LTD., Aichi (JP)

(72) Inventors: Kiyomichi Kobori, Aichi (JP); Yoshiteru Shirai, Aichi (JP); Katsuhiko Kainuma, Aichi (JP); Munehiro Tsubosaka, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 293 days.

(21) Appl. No.: 15/542,295

(22) PCT Filed: Jan. 8, 2016

(86) PCT No.: PCT/JP2016/050534
§ 371 (c)(1),
(2) Date: Jul. 7, 2017

(87) PCT Pub. No.: WO2016/111360
PCT Pub. Date: Jul. 14, 2016

(65) Prior Publication Data
US 2018/0266575 A1    Sep. 20, 2018

(30) Foreign Application Priority Data
Jan. 8, 2015  (JP) ................. 2015-002453

(51) Int. Cl.
*F16K 15/03*   (2006.01)
*F01N 13/08*   (2010.01)

(52) U.S. Cl.
CPC ............ *F16K 15/033* (2013.01); *F01N 13/08* (2013.01); *F01N 13/085* (2013.01);
(Continued)

(58) Field of Classification Search
CPC ...... F16K 15/033; F01N 13/08; F01N 13/085; F01N 2260/06; F01N 2260/14;
(Continued)

(56) References Cited

U.S. PATENT DOCUMENTS 2,827,921 A * 3/1958 Sherman ............... F16K 15/033
                                                    137/527
2,927,182 A * 3/1960 Barkan .................. H01H 33/70
                                                    137/484

(Continued)

FOREIGN PATENT DOCUMENTS

JP   H09195749 A    7/1997
JP   2013174131 A   9/2013

OTHER PUBLICATIONS

English translation of the International Search Report dated Feb. 4, 2016 for corresponding International Application No. PCT/JP2016/050534, filed Jan. 8, 2016.

(Continued)

*Primary Examiner* — Marina A Tietjen
*Assistant Examiner* — Frederick D Soski
(74) *Attorney, Agent, or Firm* — David D. Brush; Westman, Champlin & Koehler, P.A.

(57) ABSTRACT

A link couples a support body and a valve body in a first arrangement where a first link-forming member is rotationally movably supported by the support body and in which a second link-forming member is rotationally movably supported by the valve body. The link includes: a link length that is a length of the first link-forming member, as measured between a rotation axis with respect to the support body and a rotation axis with respect to the second link-forming member; and a link length that is a length of the second link-forming member, as measured between a rotation axis with respect to the valve body and a rotation axis with respect to the first link-forming member. The link lengths (Continued)

differ from each other. The link is also configured to enable coupling between the support body and the valve body in a second arrangement inverted with respect to the first arrangement.

7 Claims, 5 Drawing Sheets

(52) U.S. Cl.
CPC ...... *F01N 2260/06* (2013.01); *F01N 2260/14* (2013.01); *Y10T 137/7898* (2015.04); *Y10T 137/7901* (2015.04); *Y10T 137/7902* (2015.04)

(58) Field of Classification Search
CPC ......... Y10T 137/7898; Y10T 137/7901; Y10T 137/7902
USPC ................................ 251/303, 337, 228, 229
See application file for complete search history.

(56) References Cited

U.S. PATENT DOCUMENTS

| | | | | |
|---|---|---|---|---|
| 4,019,532 A * | 4/1977 | Schittek | ................ | F16K 1/2028 137/527 |
| 4,257,444 A * | 3/1981 | Ogle, Jr. | ................. | F16K 1/223 137/315.13 |
| 4,977,926 A * | 12/1990 | Hocking | .............. | A47B 96/068 137/512.1 |
| 4,989,635 A * | 2/1991 | Dunmire | .............. | F16K 15/033 137/512 |
| 5,107,888 A * | 4/1992 | Dunmire | ................. | E03C 1/106 137/512 |
| 5,146,949 A * | 9/1992 | Retzloff | ................ | F16K 15/033 137/527 |
| 5,226,441 A * | 7/1993 | Dunmire | ................. | E03C 1/106 137/15.01 |
| 5,318,063 A * | 6/1994 | Muddiman | ........... | F16K 15/038 137/454.2 |
| 7,007,708 B2 * | 3/2006 | Burke | .................. | F02M 63/005 123/506 |
| 7,779,859 B2 * | 8/2010 | Denike | .................. | B64D 13/02 137/512.1 |
| 8,439,088 B2 * | 5/2013 | Bramson | ............ | B60K 15/0403 137/527 |
| 9,664,119 B2 * | 5/2017 | Chen | ......................... | F02D 9/10 |
| 10,072,767 B2 * | 9/2018 | Reszewicz | ............. | F16K 15/03 |
| 10,309,551 B2 * | 6/2019 | Fiedziuk | ............... | F16K 15/038 |
| 2015/0027566 A1 | 1/2015 | Kobori | | |

OTHER PUBLICATIONS

Written Opinion of the International Searching Authority dated Mar. 1, 2016 for corresponding International Application No. PCT/JP2016/050534, filed Jan. 8, 2016.

English translation of Office Action dated Oct. 31, 2018 from the State Intellectual Property Office of China for corresponding Chinese Application No. 201680004962.1.

International Preliminary Report on Patentability and English translation of the Written Opinion of the International Searching Authority dated Mar. 1, 2016 for corresponding International Application No. PCT/JP2016/050534, filed Jan. 8, 2016.

English translation of the International Search Report dated Feb. 4, 2016 for corresponding International Application No. PCT/JP2016/050534, filed Jan. 1, 2016.

Written Opinion of the International Searching Authority dated Mar. 1, 2016 for corresponding International Application No. PCT/JP2016/050534, filed Jan. 1, 2016.

International Preliminary Report on Patentability and English translation of the Written Opinion of the International Searching Authority dated Mar. 1, 2016 for corresponding International Application No. PCT/JP2016/050534, filed Jan. 1, 2016.

\* cited by examiner

VALVE DEVICE FOR EXHAUST FLOW PASSAGE

CROSS-REFERENCE TO RELATED APPLICATION

This Application is a Section 371 National Stage Application of International Application No. PCT/JP2016/050534, filed Jan. 8, 2016, and published as WO 2016/111360 A1 on Jul. 14, 2016, not in English, which claims the benefit of Japanese Patent Application No. 2015-002453 filed on Jan. 8, 2015 with the Japan Patent Office, the contents of which are incorporated herein by reference in their entireties.

TECHNICAL FIELD

The present disclosure relates to a valve device for an exhaust flow passage.

BACKGROUND ART

There is known a valve device for an exhaust flow passage that changes a flow passage mode by opening and closing an exhaust flow passage in an exhaust system for an internal combustion engine. Patent Document 1, for example, discloses a valve device for an exhaust flow passage that opens and closes an opening arranged in a separator that partitions the inside of a muffler for an internal combustion engine into an upstream chamber and a downstream chamber. In this valve device for an exhaust flow passage, a valve body capable of closing the opening from a downstream side is supported by a support body in a rotationally movable manner, and the valve body is biased in a closing direction by a coil spring. Thus, in a low-revolution state in which the number of revolutions of the internal combustion engine is low, the pressure of exhaust gas in the upstream chamber is low, resulting in a valve closed state in which the opening is closed by the valve body. As a result, exhaust noise can be reduced. In contrast, in a high-revolution state in which the number of revolutions of the internal combustion engine has increased, the pressure of exhaust gas in the upstream chamber becomes high, which causes the valve body to be away from the opening, resulting in a valve open state in which the opening is open. As a result, pressure loss is reduced.

However, in the configuration described in Patent Document 1, as the valve body moves in an opening direction, the biasing force of the coil spring becomes larger. Thus, if the coil spring is designed to provide a larger biasing force with an emphasis on an effect of reducing exhaust noise in the low-revolution state, the effect of reducing pressure loss in the high-revolution state may be impaired. In contrast, if the coil spring is designed to provide a smaller biasing force with an emphasis on an effect of reducing pressure loss in the high-revolution state, the effect of reducing exhaust noise in the low-revolution state may be impaired.

To cope with this, a valve device for an exhaust flow passage comprising a link-type toggle mechanism has been proposed, as described in Patent Document 2, for example. The valve device for an exhaust flow passage of this kind comprises a first link member supported by a support body in a rotationally movable manner, and a second link member that is supported by a valve body in a rotationally movable manner and that is coupled to the first link member so as to be rotationally movable with respect to each other. That is, the support body, the valve body, the first link member, and the second link member form the toggle mechanism. Thus, in a valve closed state, the larger (i.e., the closer to 180 degrees) a link angle formed by the first link member and the second link member is, the stronger external force is required to rotationally move the valve body in an opening direction. Accordingly, as compared with the configuration in which the valve body is maintained in the valve closed state only with the biasing force of the biasing member (for example, the aforementioned configuration described in Patent Document 1), the external force required to open the valve body can be made larger, while reducing the biasing force of the biasing member.

PRIOR ART DOCUMENTS

Patent Documents

Patent Document 1: Japanese Unexamined Patent Application Publication No. H09-195749
Patent Document 2: Japanese Unexamined Patent Application Publication No. 2013-174131

SUMMARY OF THE INVENTION

Problems to be Solved by the Invention

Characteristics that the valve device for an exhaust flow passage is required to have could differ according to, for example, a type of the vehicle, a type of the internal combustion engine, and so on. For example, in the aforementioned configuration described in Patent Document 2, characteristics of the toggle mechanism can be changed by altering the length proportion of the first link member to the second link member. However, when multiple kinds of toggle mechanisms having different characteristics are to be fabricated, the kinds of components for the multiple kinds of toggle mechanisms are inevitably increased.

In one aspect of the present disclosure, it is desirable that multiple kinds of toggle mechanisms be fabricated from fewer components.

Means for Solving the Problems

One aspect of the present disclosure is a valve device for an exhaust flow passage comprising a valve body, a support body, a link, and a biasing member. The valve body opens and closes an exhaust flow passage. The support body supports the valve body in a rotationally movable manner. The link comprises a first link-forming member and a second link-forming member, which are coupled to each other so as to be rotationally movable with respect to each other. The link couples the support body and the valve body in a first arrangement in which the first link-forming member is supported by the support body in a rotationally movable manner and in which the second link-forming member is supported by the valve body in a rotationally movable manner. The biasing member biases the valve body in a closing direction.

The link comprises: a link length that is a length of the first link-forming member, as measured between a rotation axis with respect to the support body and a rotation axis with respect to the second link-forming member; and a link length that is a length of the second link-forming member, as measured between a rotation axis with respect to the valve body and a rotation axis with respect to the first link-forming member. The link lengths are different from each other. The link is also configured to enable coupling between the support body and the valve body in a second arrangement in which the first link-forming member is supported by the valve body in a rotationally movable manner and in which the second link-forming member is supported by the support body in a rotationally movable manner.

Such a configuration makes it possible to fabricate the valve device for an exhaust flow passage in which the link is provided in the second arrangement, i.e., that has different toggle mechanism characteristics, from the same components (common components) as those used in the valve device for an exhaust flow passage in which the link is provided in the first arrangement. Accordingly, multiple kinds of toggle mechanisms having different characteristics can be fabricated from the common components, i.e., from fewer components.

In the aforementioned configuration, the link comprises: a width, along the rotation axis, of a portion supported by the support body in the first link-forming member; and a width, along the rotation axis, of a portion supported by the valve body in the second link-forming member. The widths may be the same as each other. According to such a configuration, the link usable both in the first arrangement and in the second arrangement can be achieved with a simple configuration.

In the aforementioned configuration, the first link-forming member and the second link-forming member each may comprise: a pair of opposed plates facing each other; and a coupling plate that couples the pair of opposed plates to each other. Further, at least one of the pair of opposed plates of the first link-forming member or the pair of opposed plates of the second link-forming member may comprise a pair of first plate parts positioned in parallel to each other so as to provide a first width, a pair of second plate parts positioned in parallel to each other so as to provide a second width wider than the first width, and a pair of third plate parts each coupling the corresponding first plate part and the corresponding second plate part to each other. According to such a configuration, the link in which the width, along the rotation axis, of the portion supported by the support body in the first link-forming member and the width, along the rotation axis, of the portion supported by the valve body in the second link-forming member are the same as each other can be achieved with a simple configuration.

In the aforementioned configuration, the coupling plate may be continuous with both the pair of first plate parts and the pair of second plate parts. Such a configuration enables reinforcement of the opposed plates having the pair of first plate parts, the pair of second plate parts, and the pair of third plate parts provided thereto.

In the aforementioned configuration, the pair of first plate parts, the pair of second plate parts, and the pair of third plate parts may be provided only to the pair of opposed plates of whichever of the first link-forming member or the second link-forming member has the longer link length. Such a configuration enables enhancement of the strength of the opposed plates having the shorter link length as compared with a case in which the pair of first plate parts, the pair of second plate parts, and the pair of third plate parts are provided both to the first link-forming member and to the second link-forming member. Moreover, fabrication can be facilitated as compared with a case in which the pair of first plate parts, the pair of second plate parts, and the pair of third plate parts are provided only to the opposed plates having the shorter link length.

Figure 1:
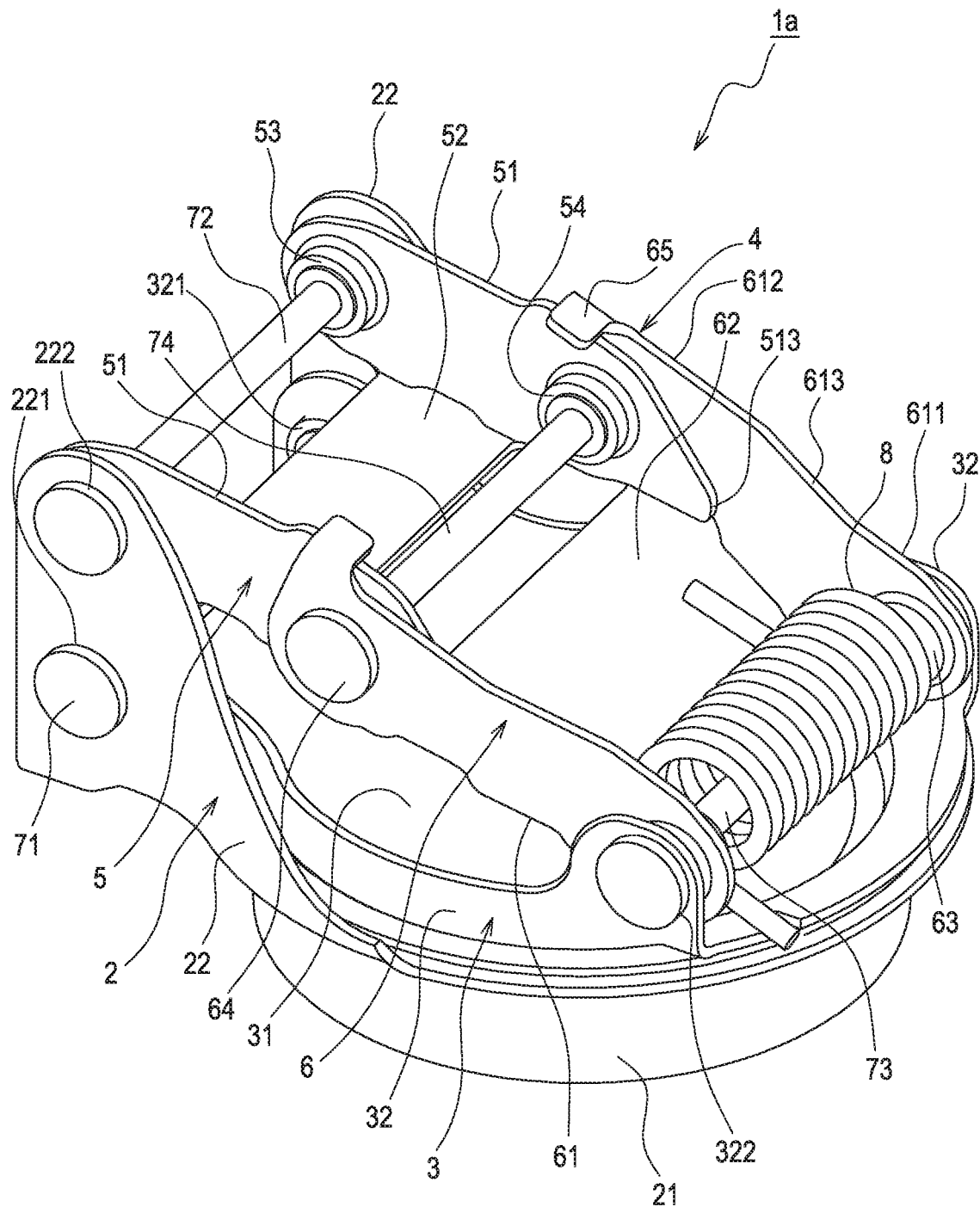
FIG. 1 is a perspective view of a valve device for an exhaust flow passage according to an embodiment.

EXPLANATION OF REFERENCE NUMERALS 1a, 1b . . . valve device, 2 . . . support body, 3 . . . valve body, 4 . . . link, 5 . . . first link-forming member, 6 . . . second link-forming member, 8 . . . biasing member, 51 . . . opposed plate, 52 . . . coupling plate, 53 . . . second bearing part, 54 . . . fourth bearing part, 61 . . . opposed plate, 62 . . . coupling plate, 63 . . . third bearing part, 64 . . . fourth bearing part, 65 . . . claw part, 71 . . . first rotation axis member, 72 . . . second rotation axis member, 73 . . . third rotation axis member, 74 . . . fourth rotation axis member, 611 . . . first plate part, 612 . . . second plate part, 613 . . . third plate part, C1 . . . first rotation axis, C2 . . . second rotation axis, C3 . . . third rotation axis, C4 . . . fourth rotation axis, L1 . . . first link line, L2 . . . second link line

MODE FOR CARRYING OUT THE INVENTION

An embodiment to which the present disclosure is applied will be described below with reference to the drawings.

1. Configuration

Figure 2A:
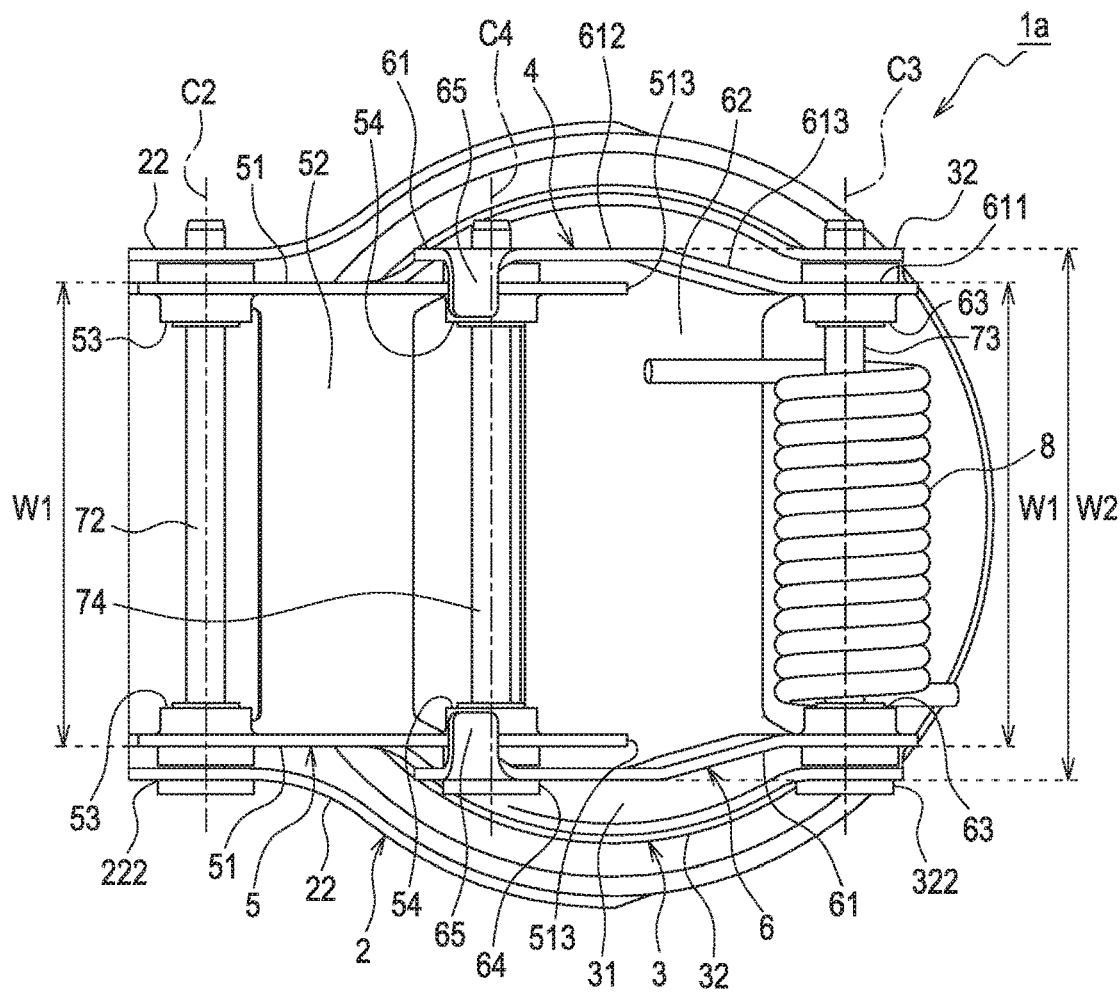
FIG. 2A is a plan view of the valve device for an exhaust flow passage according to the embodiment in a valve closed state.
Figure 2B:
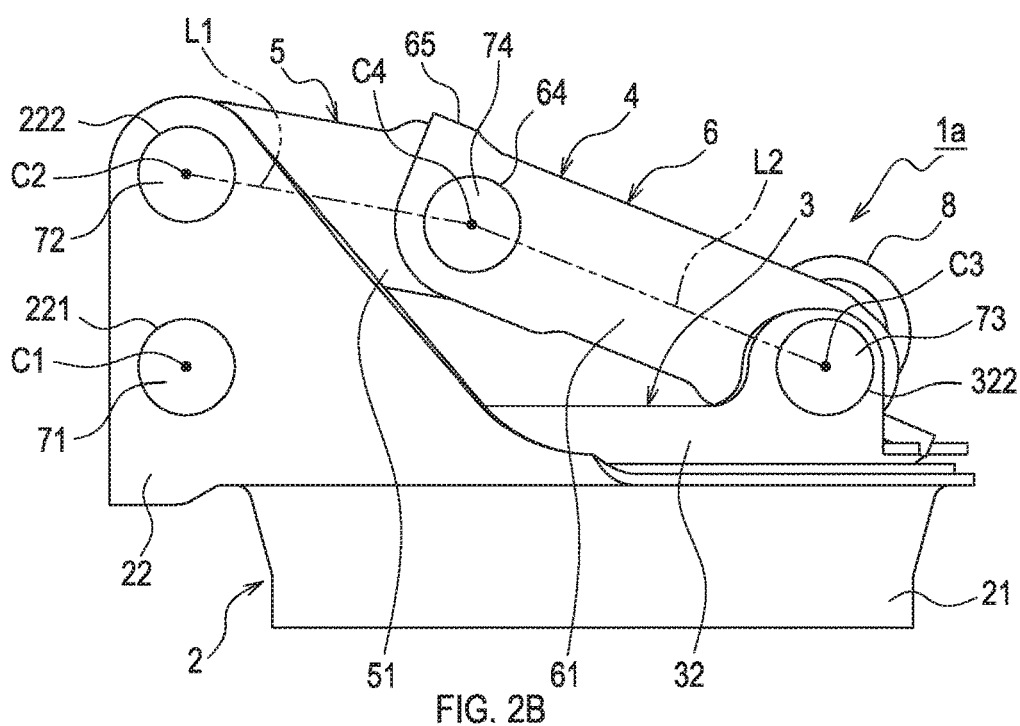
FIG. 2B is a side view thereof.

A valve device for an exhaust flow passage (hereinafter simply referred to as a "valve device") 1a shown in FIG. 1, FIG. 2A, and FIG. 2B is provided in an exhaust flow passage for exhaust gas discharged from an internal combustion engine mounted on a vehicle. Similarly to a configuration described in the aforementioned Patent Document 2, the valve device 1a of the present embodiment is provided within a not-shown muffler that forms a part of the exhaust flow passage. The valve device 1a is attached to a downstream-side end portion of an inner pipe that allows a plurality of chambers provided within the muffler to communicate with one another, and the valve device 1a opens and closes an opening of the aforementioned end portion (i.e., a bypass flow passage for exhaust gas) from a downstream side.

The valve device 1a comprises a support body (stay) 2, a valve body (butterfly valve) 3, a link 4, four rotation axis members 71 to 74, and a biasing member 8. The support body 2 supports in a rotationally movable manner the valve body 3 that opens and closes the exhaust flow passage. The link 4 comprises a first link-forming member 5 and a second link-forming member 6, which are coupled to each other so as to be rotationally movable with respect to each other. The link 4 couples the support body 2 and the valve body 3 in an arrangement (a first arrangement) in which the first link-forming member 5 is supported by the support body 2 in a rotationally movable manner and in which the second link-forming member 6 is supported by the valve body 3 in a rotationally movable manner. The biasing member 8 biases the valve body 3 in a closing direction.

The support body 2 comprises a body part 21 of a generally annular shape and a pair of side plates 22. The pair of side plates 22 are provided so as to stand upright from left and right sides of the body part 21 and are symmetrical to each other. The body part 21 is fixed to the opening of the downstream-side end portion of the inner pipe. In the body part 21, a communication hole for communication with the opening of the inner pipe is arranged at a portion covered by the valve body 3. Each side plate 22 comprises a first bearing part 221 containing a circular through-hole for insertion of a first rotation axis member 71 that supports the valve body 3 in a rotationally movable manner. Further, each side plate 22 comprises a second bearing part 222 containing a circular through-hole for insertion of a second rotation axis member 72 that supports the first link-forming member 5 in a rotationally movable manner.

The valve body 3 comprises a body part 31 of a generally disk shape and a pair of side plates 32. The pair of side plates 32 are provided so as to stand upright from left and right sides of the body part 31 and are symmetrical to each other. The body part 31 has a shape capable of closing the opening of the inner pipe (specifically, the communication hole formed in the body part 21 of the support body 2). Each side plate 32 comprises a first bearing part 321 containing a circular through-hole for insertion of the first rotation axis member 71. That is, the valve body 3 is coupled to the support body 2 via the first rotation axis member 71, and is supported by the support body 2 so as to be rotationally movable about a rotation axis (hereinafter referred to as a "first rotation axis C1") of the first rotation axis member 71. Rotational movement of the valve body 3 brings a valve closed state in which the opening of the inner pipe is closed by the valve body 3, and a valve open state in which the opening is open. Additionally, each side plate 32 comprises a third bearing part 322 in a position on a side apart from the first bearing part 321, i.e., on a leading-end side of the valve body 3. The third bearing part 322 contains a circular through-hole for insertion of a third rotation axis member 73 that supports the second link-forming member 6 in a rotationally movable manner.

The first link-forming member 5 comprises a pair of opposed plates 51 that face each other and are symmetrical to each other, and a coupling plate 52 that couples the pair of opposed plates 51 to each other. Each opposed plate 51 comprises a second bearing part 53 in one of the both end portions of the opposed plate 51. The second bearing part 53 contains a circular through-hole for insertion of the second rotation axis member 72. That is, the first link-forming member 5 is coupled to the support body 2 via the second rotation axis member 72, and is supported by the support body 2 so as to be rotationally movable about a rotation axis (hereinafter referred to as a "second rotation axis C2") of the second rotation axis member 72. Additionally, each opposed plate 51 comprises a fourth bearing part 54 on a side opposite a side on which the second bearing part 53 is provided, of the two end portions of the opposed plate 51. The fourth bearing part 54 contains a circular through-hole for insertion of a fourth rotation axis member 74 that supports the second link-forming member 6 in a rotationally movable manner.

The second link-forming member 6 comprises a pair of opposed plates 61 that face each other and are symmetrical to each other, and a coupling plate 62 that couples the pair of opposed plates 61 to each other. Each opposed plate 61 comprises a third bearing part 63 in one of the both end portions of the opposed plate 61. The third bearing part 63 contains a circular through-hole for insertion of the third rotation axis member 73. That is, the second link-forming member 6 is coupled to the valve body 3 via the third rotation axis member 73, and is supported by the valve body 3 so as to be rotationally movable about a rotation axis (hereinafter referred to as a "third rotation axis C3") of the third rotation axis member 73. Additionally, each opposed plate 61 comprises a fourth bearing part 64 on a side opposite a side on which the third bearing part 63 is provided, of the two end portions of the opposed plate 61. The fourth bearing part 64 contains a circular through-hole for insertion of the fourth rotation axis member 74 that supports the first link-forming member 5 in a rotationally movable manner.

That is, the first link-forming member 5 and the second link-forming member 6 are coupled to each other via the fourth rotation axis member 74, and are coupled to each other so as to be rotationally movable with respect to each other about a rotation axis (hereinafter referred to as a "fourth rotation axis C4") of the fourth rotation axis member 74. Here, respective axial directions of the first rotation axis C1, the second rotation axis C2, the third rotation axis C3, and the fourth rotation axis C4 are parallel to one another.

As described above, the support body 2, the valve body 3, the first link-forming member 5, and the second link-forming member 6 are coupled to one another so as to be rotationally movable with respect to one another via the four rotation axis members 71 to 74, thereby forming a link-type toggle mechanism (a link mechanism).

As shown in FIG. 2B, in the valve closed state, a link angle formed by the first link-forming member 5 and the second link-forming member 6 becomes large. Specifically, in a plane orthogonal to an axial line of the second rotation axis C2, the link angle formed by a first link line L1 connecting the second rotation axis C2 (in more detail, an intersection point of the plane and the rotation axis; the same applies to descriptions below) and the fourth rotation axis C4 to each other, and a second link line L2 connecting the third rotation axis C3 and the fourth rotation axis C4 to each other is designed to be an angle close to 180 degrees in the valve closed state. The link angle becomes smaller as the valve body 3 rotationally moves in an opening direction, and is the largest in the valve closed state. Thus, in the valve closed state, a strong external force is required to rotationally move the valve body 3 in the opening direction.

The first link-forming member 5 and the second link-forming member 6 constitute two stopper mechanisms, respectively a first stopper mechanism and a second stopper mechanism, that limit the maximum angle of the link angle. The first stopper mechanism limits the link angle by abutment of a leading end 513 of the opposed plate 51 of the first link-forming member 5 and the coupling plate 62 of the second link-forming member 6 against each other. The second stopper mechanism limits the link angle by abutment of the opposed plate 51 of the first link-forming member 5 and a claw part 65 provided to the opposed plate 61 of the second link-forming member 6 against each other.

The biasing member (in the present embodiment, a coil spring) 8, through which the third rotation axis member 73 has been inserted, is mounted so as to act on the valve body 3 and the second link-forming member 6. The biasing member 8 biases the valve body 3 and the second link-forming member 6 in a direction to bring them closer to a positional relationship in the valve closed state (i.e., in a direction to make an angle formed by the valve body 3 and the second link-forming member 6 closer to that in the valve closed state). Accordingly, in a state in which no external force to open the valve body 3 is applied, the valve body 3 is in the valve closed state.

The link 4 is designed such that a length (link length) of the first link-forming member 5 and a length (link length) of the second link-forming member 6 differ from each other. The link length of the first link-forming member 5 mentioned here is a distance between the rotation axis C2 and the rotation axis C4, i.e., a length of the first link line L1. Similarly, the link length of the second link-forming member 6 is a distance between the rotation axis C3 and the rotation axis C4, i.e., a length of the second link line L2. In this example, the link length L2 of the second link-forming member 6 is longer than the link length L1 of the first link-forming member 5.

Further, the link 4 is designed such that a width, along the rotation axis C2, of a portion supported by the support body 2 in the first link-forming member 5 and a width, along the rotation axis C3, of a portion supported by the valve body 3 in the second link-forming member 6 are the same width W1. Specifically, the respective opposed plates 51 of the first link-forming member 5 are provided in parallel to each other so as to provide the constant width W1. On the other hand, the respective opposed plates 61 of the second link-forming member 6 comprise a pair of first plate parts 611 positioned in parallel to each other so as to provide the width W1, a pair of second plate parts 612 positioned in parallel to each other so as to provide a width W2 wider than the width W1, and a pair of third plate parts 613 each coupling the corresponding first plate part 611 and the corresponding second plate part 612 to each other. Thus, the second plate parts 612 in the opposed plates 61 of the second link-forming member 6 are positioned so as to hold therebetween end portions of the opposed plates 51 of the first link-forming member 5 from outside. The coupling plate 62 of the second link-forming member 6 is formed so as to be continuous with both the first plate parts 611 and the second plate parts 612.

That is, the link 4 is designed to also be able to couple the support body 2 and the valve body 3 in an arrangement (a second arrangement) in which the first link-forming member 5 is supported by the valve body 3 in a rotationally movable manner and in which the second link-forming member 6 is supported by the support body 2 in a rotationally movable manner. Widths of the link 4 at both end portions thereof supported by the support body 2 and the valve body 3 do not need to be identical with each other in a strict sense. It is sufficient if the link 4 can be used both in the first arrangement and in the second arrangement.

2. Effects

With the embodiment described above in detail, the following effects can be obtained.

Figure 3:
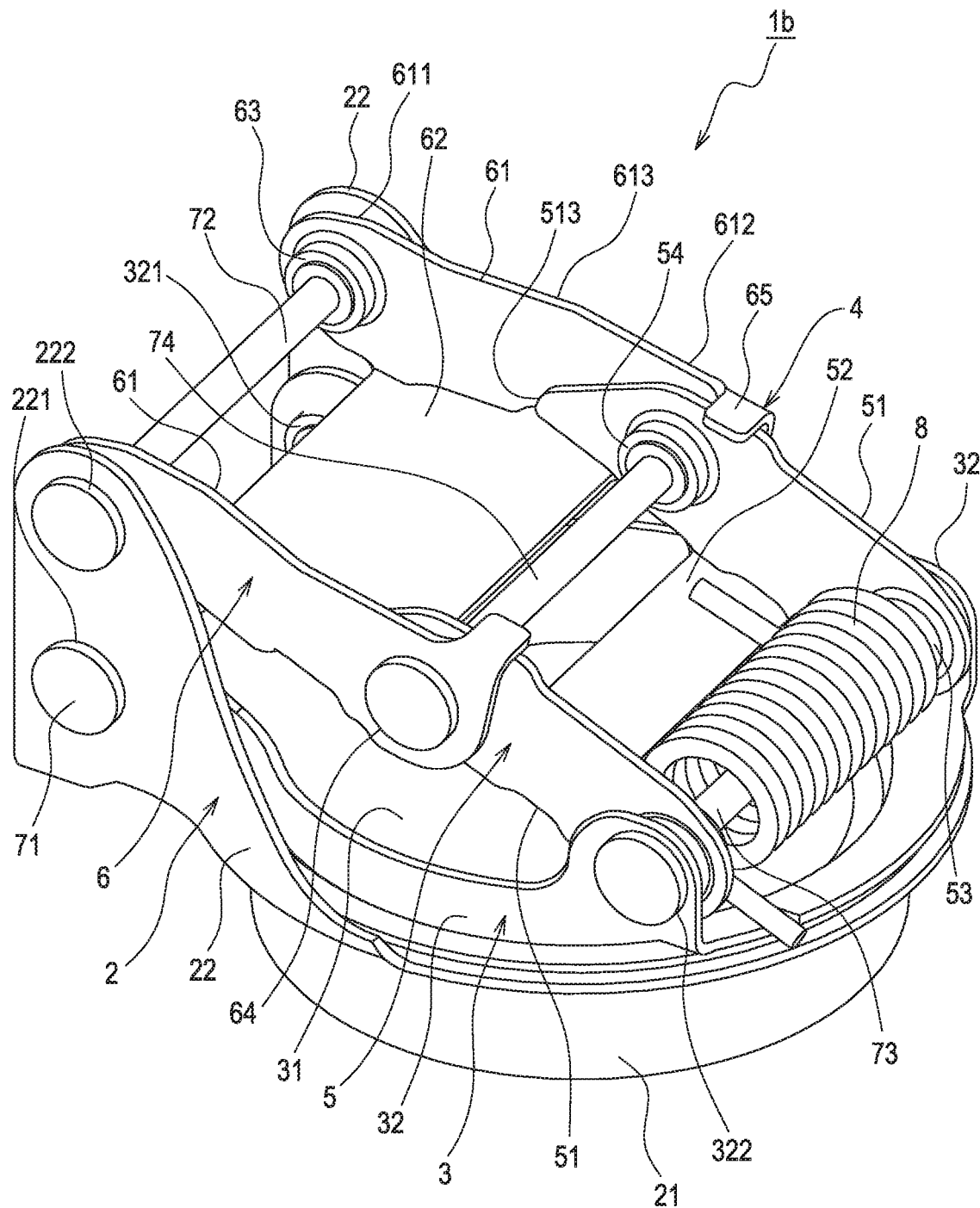
FIG. 3 is a perspective view of the valve device for an exhaust flow passage in which a link is used in an inverted arrangement.
Figure 4A:
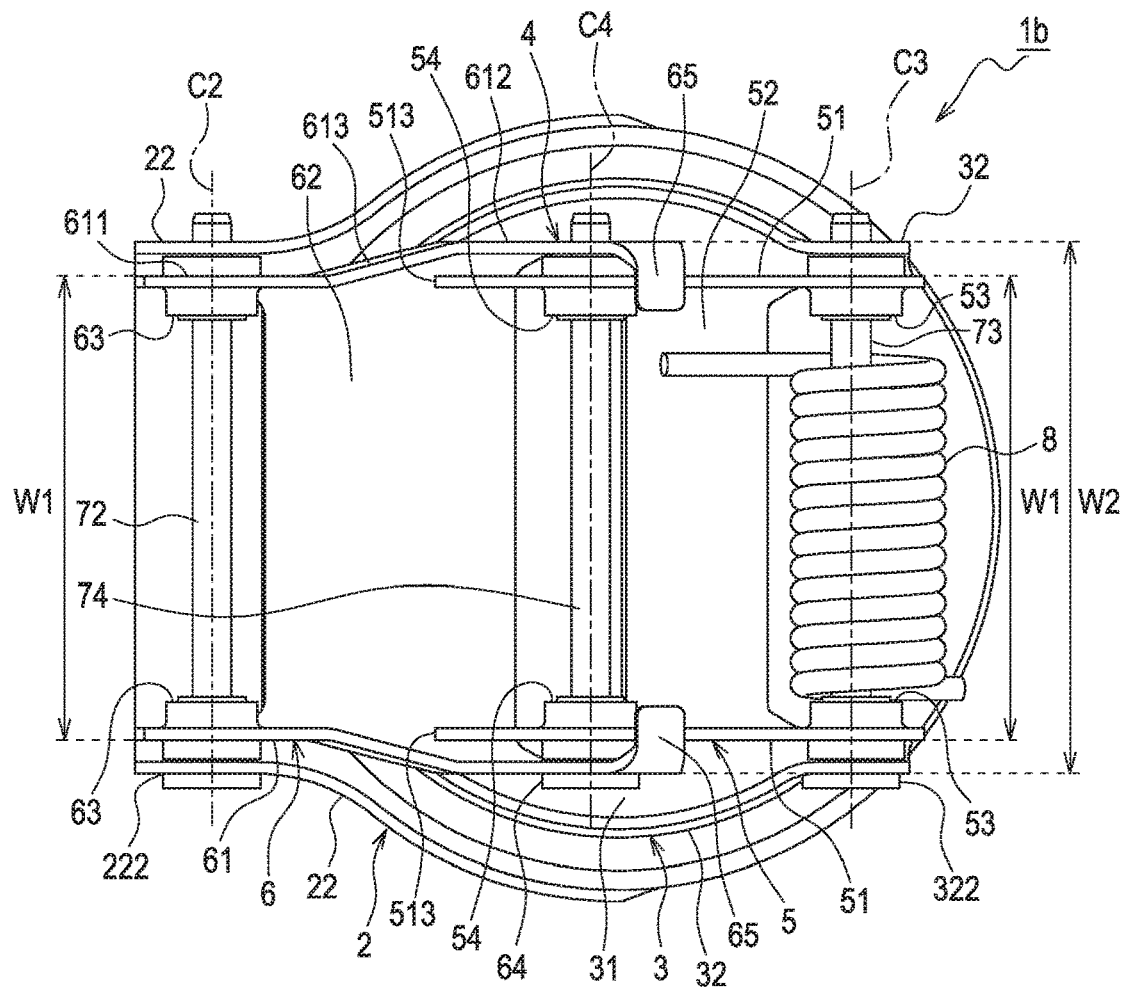
FIG. 4A is a plan view of the valve device for an exhaust flow passage in a valve closed state in which the link is used in the inverted arrangement with respect to that in FIG. 1.
Figure 4B:
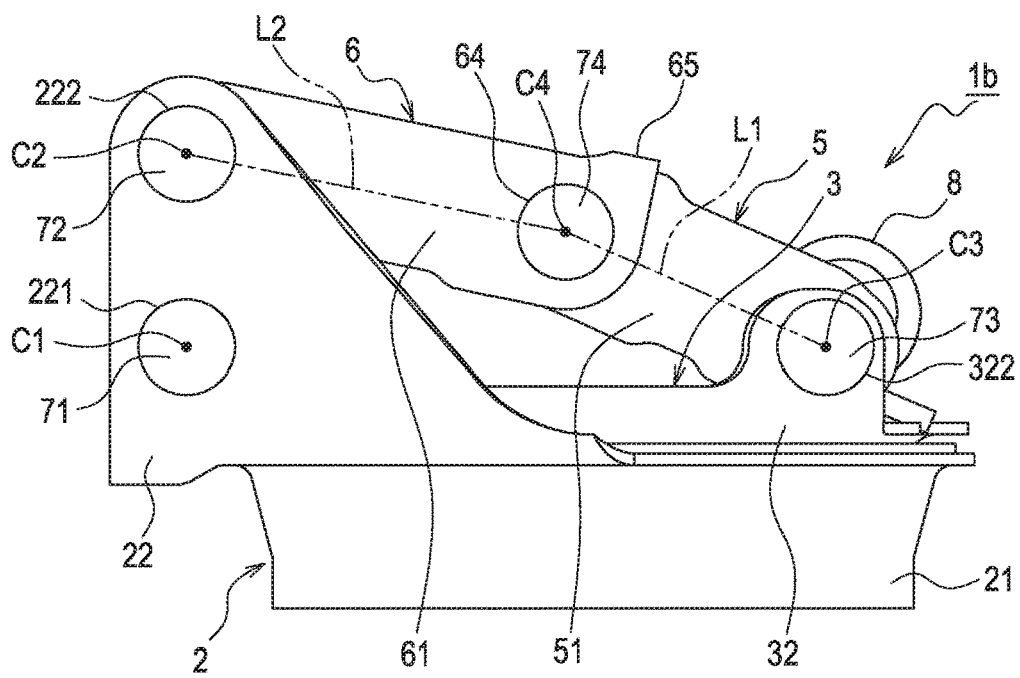
FIG. 4B is a side view thereof.

(1) In the link 4, the link length L1 of the first link-forming member 5 and the link length L2 of the second link-forming member 6 differ from each other. Further, in the link 4, the width, along the rotation axis C2, of the portion supported by the support body 2 in the first link-forming member 5 and the width, along the rotation axis C3, of the portion supported by the valve body 3 in the second link-forming member 6 are the same width W1. Thus, as shown in FIG. 3, FIG. 4A, and FIG. 4B, a valve device 1*b* having different toggle mechanism characteristics can be fabricated from the same components (common components) as those used in the valve device 1*a*. In the valve device 1*b*, the link 4 is used in an arrangement (the second arrangement) inverted with respect to the arrangement (the first arrangement) for the valve device 1*a*. Specifically, the first link-forming member 5 is supported by the valve body 3 in a rotationally movable manner, and the second link-forming member 6 is supported by the support body 2 in a rotationally movable manner. That is, the configuration of the link 4 allows for exchange of the first link-forming member 5 and the second link-forming member 6, which are different in length from each other, in their arrangement. Accordingly, multiple kinds of toggle mechanisms having different characteristics can be fabricated from fewer components.

Figure 5:
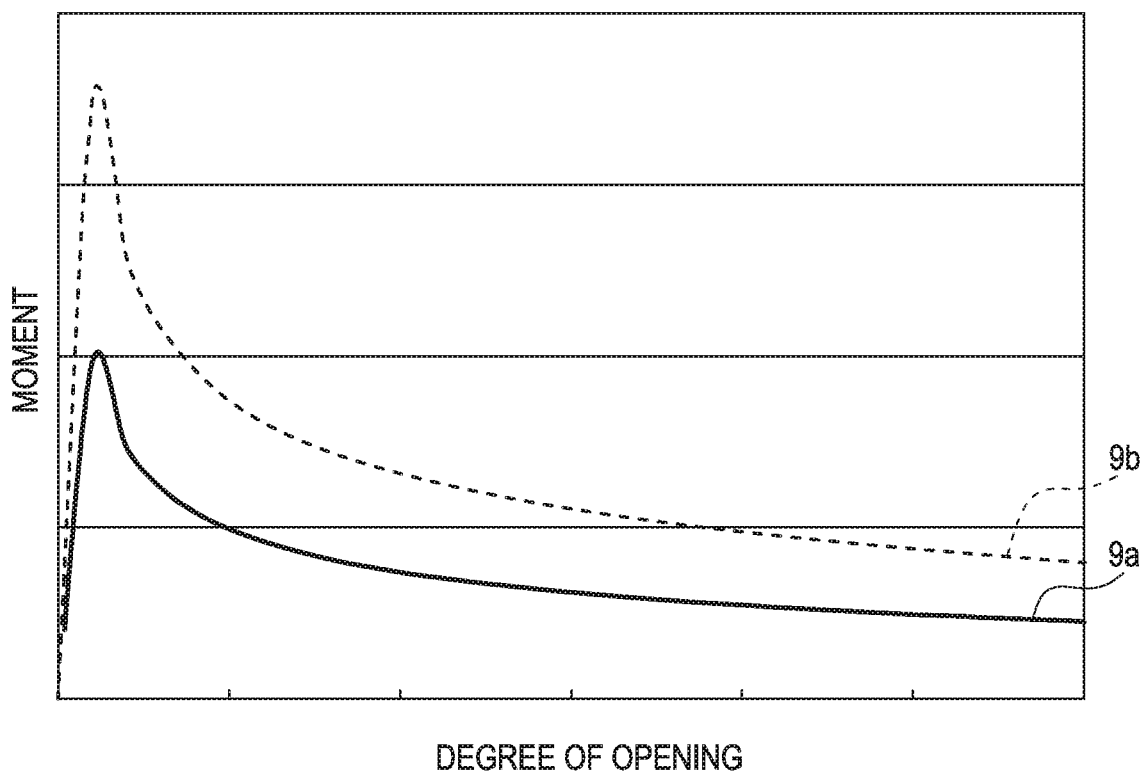
FIG. 5 is a graph showing loading characteristics of the valve device for an exhaust flow passage.

As shown in FIG. 5, the moment (a broken line 9*b*) corresponding to a degree of opening of the valve body of the valve device 1*b* when the link 4 is in the second arrangement is larger than the moment (a solid line 9*a*) corresponding to a degree of opening of the valve body of the valve device 1*a* when the link 4 is in the first arrangement. That is, the valve device 1*b* has a characteristic that the valve body 3 thereof is more difficult to open (i.e., requires more load) than that of the valve device 1*a*. Accordingly, the valve devices 1*a* and 1*b* having different characteristics from each other can be fabricated from the same components, to thereby make it possible, for example, to use the valve device 1*a* for a configuration in which sporty exhaust noise is required, and to use the valve device 1*b* for a configuration in which highly quiet exhaust noise is required. In FIG. 5, the leftmost end of the X-axis is a position where the degree of opening of the valve body is 0, and the lowermost end of the Y-axis is a position where the moment is 0.

(2) Since the widths of the both end portions of the link 4 supported by the support body 2 and the valve body 3 are the same as each other, widths and through-holes in the portions supporting the link 4 in the support body 2 and the valve body 3 also can be standardized. Accordingly, a link 4 usable both in the first arrangement and in the second arrangement can be achieved with a simple configuration.

(3) The opposed plates 51 of the first link-forming member 5 are provided in parallel to each other so as to provide the constant width W1. On the other hand, the opposed plates 61 of the second link-forming member 6 comprise the pair of first plate parts 611 positioned in parallel to each other so as to provide the width W1, the pair of second plate parts 612 positioned in parallel to each other so as to provide the width W2 wider than the width W1, and the pair of third plate parts 613 each coupling the corresponding first plate part 611 and the corresponding second plate part 612 to each other. Accordingly, a link 4 in which the widths of the both end portions thereof supported by the support body 2 and the valve body 3 are the same as each other can be achieved with a simple configuration.

(4) The coupling plate 62 of the second link-forming member 6 is continuous with both the first plate parts 611 and the second plate parts 612. Such a configuration enables reinforcement of the opposed plates 61 of the second link-forming member 6 by the coupling plate 62. Specifically, since the link 4 functions in a high-temperature environment, the opposed plates 61 having a bent shape for change of the width of the second link-forming member 6 are more likely to be deformed than the opposed plates 51 being formed so as to provide the constant width of the first link-forming member 5. For this reason, the coupling plate 62 of the second link-forming member 6 is formed so as to be continuous with the first plate parts 611 and the second plate parts 612. Such a configuration enables the opposed plates 61 to be less likely to be deformed than a configuration in which the coupling plate 62 is formed so as to be continuous with either one of the first plate parts 611 or the second plate parts 612.

(5) The first plate parts 611, the second plate parts 612, and the third plate parts 613 are provided only to the opposed plates 61 of the second link-forming member 6, which has a longer link length. That is, the opposed plates 51 of the first link-forming member 5 can be formed in parallel to each other so as to provide the constant width of the first link-forming member 5. Accordingly, deformation of the opposed plates 51 of the first link-forming member 5 can be inhibited as compared with a configuration in which both the widths of the first link-forming member 5 and the second link-forming member 6 change. Moreover, fabrication can be facilitated as compared with a configuration in which the opposed plates 61 of the second link-forming member 6 are formed so as to provide a constant width of the second link-forming member 6 and the opposed plates 51 of the first link-forming member 5 having the shorter link length are formed so as to change the width of the first link-forming member 5.

3. Other Embodiments

Although the embodiment of the present disclosure has been described so far, it is needless to say that the present disclosure is not limited to the aforementioned embodiment but can take various forms.

(1) Illustrated in the aforementioned embodiment is the configuration in which the opposed plates 51 of the first link-forming member 5 are formed so as to provide the constant width of the first link-forming member 5, and in which the width of the second link-forming member 6 at both end portions of the opposed plates 61 varies depending on the position. However, the configuration of the first link-forming member and the second link-forming member is not limited to this. For example, a configuration may be adopted in which the opposed plates of the second link-forming member are formed so as to provide a constant width of the second link-forming member, and in which the width of the first link-forming member at the both end portions of the opposed plates varies depending on the position. Alternatively, for example, a configuration may be adopted in which both the width of the first link-forming member and the width of the second link-forming member vary at both end portions thereof depending on the position.

(2) Illustrated in the aforementioned embodiment is the configuration in which the coupling plate 62 of the second link-forming member 6 is formed so as to be continuous with the first plate parts 611 and the second plate parts 612 of the opposed plates 61. However, the configuration of the coupling plate is not limited to this. For example, the coupling plate may be configured to be continuous with either one of the first plate parts or the second plate parts.

(3) Illustrated in the aforementioned embodiment is the link 4 in which the widths of both end portions thereof supported by the support body 2 and the valve body 3 are the same as each other. However, the configuration of the link is not limited to this. For example, any configuration may be adopted if the link in the first arrangement and the link in the second arrangement can be fabricated from the same components (common components).

(4) Positions, structures, etc., of the first stopper mechanism and the second stopper mechanism in the aforementioned embodiment are one example, and are not particularly limited to this. For example, the stopper mechanisms may be one in number or may be three or more in number. Alternatively, the link-forming members may be configured to comprise no stopper mechanisms.

(5) Illustrated in the aforementioned embodiment is the configuration in which the biasing member 8, through which the third rotation axis member 73 has been inserted, is mounted so as to act on the valve body 3 and the second link-forming member 6. However, the configuration of the biasing member 8 is not limited to this. For example, a configuration may be adopted in which the biasing member 8, through which the fourth rotation axis member 74 has been inserted, is mounted so as to act on the first link-forming member 5 and the second link-forming member 6. Alternatively, for example, a configuration may be adopted in which the biasing member 8, through which the second rotation axis member 72 has been inserted, is mounted so as to act on the support body 2 and the first link-forming member 5. Further, the kind of the biasing member is not particularly limited. For example, a so-called double torsion spring having a shape of two coil springs combined side by side may be used as the biasing member.

(6) Illustrated in the aforementioned embodiment is the valve device 1a that opens and closes the opening of the downstream-side end portion of the inner pipe within the muffler. However, the position where the valve device is attached is not limited to this.

(7) Functions of one constituent element in the aforementioned embodiment may be divided and separately performed by a plurality of constituent elements, or functions of a plurality of constituent elements may be integrated and performed by one constituent element. At least part of the configuration in the aforementioned embodiment may be replaced with a known configuration having a similar function. Part of the configuration in the aforementioned embodiment may be omitted as long as the problem can be solved. Addition, replacement, etc., of at least part of the configuration in the aforementioned embodiment may be carried out with respect to the configuration in the aforementioned other embodiment. It is to be noted that any modes included in the technical idea specified by the languages of the claims are embodiments of the present disclosure.

The invention claimed is:
1. A valve device for an exhaust flow passage comprising:
a valve body to open and close an exhaust flow passage;
a support body that supports the valve body in a rotationally movable manner;
a link comprising a first link-forming member and a second link-forming member, which are coupled to each other so as to be rotationally movable with respect to each other, the link coupling the support body and the valve body in a first arrangement in which the first link-forming member is supported by the support body in a rotationally movable manner and in which the second link-forming member is supported by the valve body in a rotationally movable manner; and
a biasing member to bias the valve body in a closing direction,
wherein the link comprises: a link length that is a length of the first link-forming member, as measured between a rotation axis with respect to the support body and a rotation axis with respect to the second link-forming member; and a link length that is a length of the second link-forming member, as measured between a rotation axis with respect to the valve body and a rotation axis with respect to the first link-forming member, the link lengths being different from each other, and wherein the link is also configured to enable coupling between the support body and the valve body in a second arrangement in which the first link-forming member is supported by the valve body in a rotationally movable manner and in which the second link-forming member is supported by the support body in a rotationally movable manner, wherein the link comprises: a width, along the rotation axis, of a portion supported by the support body in the first link-forming member; and a width, along the rotation axis, of a portion supported by the valve body in the second link-forming member, the widths being the same as each other, wherein the first link-forming member and the second link-forming member each comprise: a pair of opposed plates facing each other; and a coupling plate that couples the pair of opposed plates to each other, and wherein at least one of the pair of opposed plates of the first link-forming member or the pair of opposed plates of the second link-forming member comprises a pair of first plate parts positioned in parallel to each other so as to provide a first width, a pair of second plate parts positioned in parallel to each other so as to provide a second width wider than the first width, and a pair of third plate parts each coupling the corresponding first plate part and the corresponding second plate part to each other.

2. The valve device for an exhaust flow passage according to claim 1,
wherein the coupling plate is continuous with both the pair of first plate parts and the pair of second plate parts.

3. The valve device for an exhaust flow passage according to claim 1,
wherein the pair of first plate parts, the pair of second plate parts, and the pair of third plate parts are provided only to the pair of opposed plates of whichever of the first link-forming member or the second link-forming member has the longer link length.

4. A valve device configured to operate in a first arrangement, the valve device comprising:
 a valve body;
 a support body;
 a link including:
  a first member including a pair of first member opposed plates that include:
   a first plate, and
   a second plate opposed to the first plate;
  a second member including a pair of second member opposed plates that include:
   a third plate, and
   a fourth plate opposed to the third plate;
 a biasing member configured to bias the valve body against the support body;
 a first rotation axis member defining a first axis;
 a second rotation axis member defining a second axis;
 a third rotation axis member defining a third axis; and
 a fourth rotation axis member defining a fourth axis,
 wherein the support body includes:
  support body side plates including:
   a first support body side plate, and
   a second support body side plate,
 wherein, the support body side plates are configured to support the first rotation axis member,
 wherein the first rotation axis member is configured to pivot the valve body with respect to the support body,
 wherein the support body side plates are further configured to support the second rotation axis member,
 wherein the second axis member is downstream of the first axis member,
 wherein, in the first arrangement, the second rotation axis member is configured to rotatably support a first end of the first member such that first plate and the second plate are approximately a first width apart at the second rotation axis member,
 wherein the valve body is configured to support the third axis member,
 wherein, in the first arrangement, the third rotation axis member is configured to support a first end of the second member such that the third plate and the fourth plate are approximately the first width apart at the third rotation axis member,
 wherein the fourth rotation axis member rotatably supports a second end of the first member and a second end of the second member;
 wherein the first plate and the second plate are substantially flat plates, such that the first plate and the second plate are approximately the first width apart at the fourth rotation axis member,
 wherein the third plate and the fourth plate are each bent such that they are approximately a second width apart at the fourth rotation axis member,
 wherein the second width is greater than the first width, and
 wherein the second end of the second member includes:
  a first claw extending inwardly from the third plate towards the fourth plate, and
  a second claw extending inwardly from the fourth plate towards the third plate.

5. The valve device of claim 4,
wherein the first claw is configured to contact an edge of the first plate and the second claw is configured to contact an edge of the second plate to prevent the fourth axis from crossing a plane intersecting the second axis and the third axis.

6. The valve device of claim 4,
wherein the valve device is further configured to operate in a second arrangement,
wherein, in the second arrangement, the link is rotated approximately 180 degrees with respect to the first arrangement, such that:
 the first end of the first member is supported by the third rotation axis member, and
 the first end of the second member is supported by the second rotation axis member.

7. The valve device of claim 4,
wherein a first link line separates the second axis from the fourth axis by a first length,
wherein a second link separates the third axis from the fourth axis by a second length, and
wherein the first length is less than the second length.

* * * * *